(No Model.)
J. S. PEIRONNET.
FERTILIZER DISTRIBUTER.
No. 271,912. Patented Feb. 6, 1883.
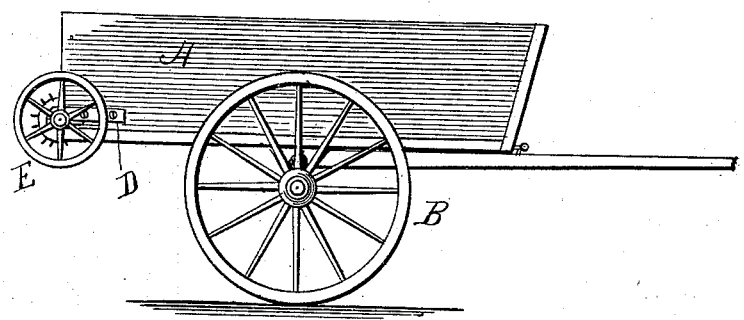
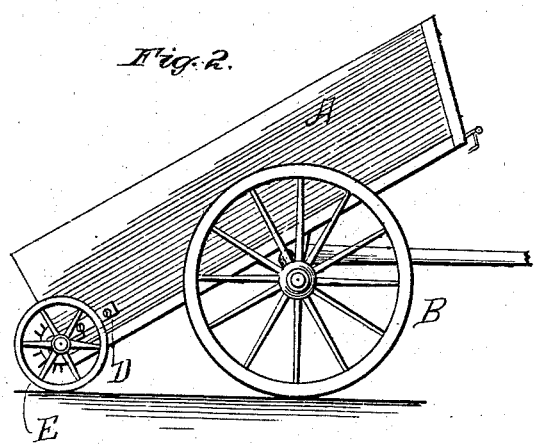
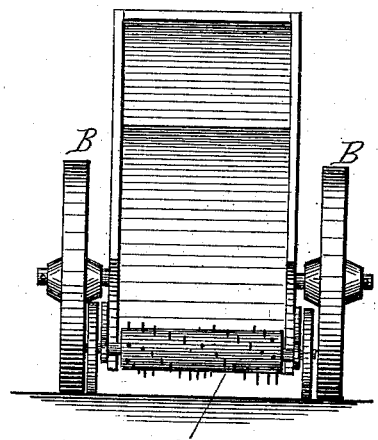
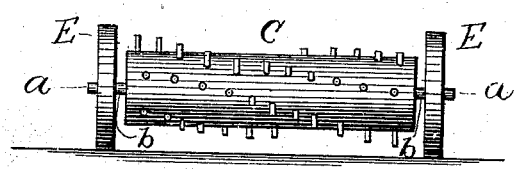
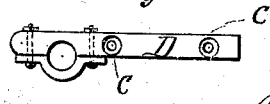

UNITED STATES PATENT OFFICE.

JAMES S. PEIRONNET, OF WHEATON, ILLINOIS.

FERTILIZER-DISTRIBUTER.

SPECIFICATION forming part of Letters Patent No. 271,912, dated February 6, 1883.

Application filed October 10, 1882. (No model.)

*To all whom it may concern:*

Be it known that I, JAMES S. PEIRONNET, a citizen of the United States, residing at Wheaton, in the county of Du Page and State of Illinois, have invented certain new and useful Improvements in Fertilizer - Distributers, of which the following is a specification, reference being had therein to the accompanying drawings.

The object of my invention is to provide, in an ordinary dumping - cart, suitable means whereby manure and other fertilizer conveyed may be automatically distributed over a field, and to arrange such means in a manner so as to be adjustable upon the cart for distributing in large or small quantities.

The novelty consists in the combination and arrangement, in connection with a dumping-cart having perforations in both its rear sides near edges to receive securing-bolts, of the perforated rearwardly - extending arms carrying axle-clips for the toothed roller, and in the toothed roller extending in length nearly the entire width of the cart-body, provided with wheels of much less diameter than those of the cart-wheels, and having an axle with bearing portions to be received in the supporting-arms, all as will be hereinafter more fully set forth.

In the accompanying drawings, to which reference is made, forming a part of this specification, Figure 1 is a representation of a side elevation of a cart, showing the body raised with my device attached. Fig. 2 is a side view of a cart, showing the body thrown back with my device attached. Fig. 3 is a rear view, showing the cart in a dumped position with my invention applied. Fig. 4 is an enlarged view of the toothed roller with wheels, and Fig. 5 is a view of a side elevation of the supporting-arms.

The letter A indicates a cart-body of ordinary construction, mounted upon the usual wheels, B.

C represents a roller provided with a number of radial arms or teeth for discharging the fertilizer from the cart. This roller is rigidly secured to an axle, *a*, which has a bearing portion, *b*, at each end of the said roller, and are journaled in the arms D and friction-clip secured thereto. To the outer ends of this axle *a* are secured wheels E, which are sufficiently small to be raised from obstructions when the distributing attachment is not in use, and when in use to allow the body of the cart to assume an inclined position for the discharge of its contents.

D represents arms of any suitable material, which are perforated, as shown at *c*, to be secured—one at each side of the cart-body—by means of bolts or other suitable fastening devices. The arms supporting the toothed roller may be provided with any number of holes or perforations, so that the said roller may be moved to or from the discharge-opening of the cart and the fertilizer distributed in any desired quantity upon the ground.

It will be readily seen that this attachment may be easily removed from a cart or wagon and applied thereto at a very trifling expense. It is not necessary that a cart should be altered or injured in any way for the attachment of my improvement, as the only thing necessary being to perforate its side boards for the reception of bolts by which the roller-supporting arms may be secured.

In operation when the cart is loaded and conveyed to a field to be fertilized, the cart is dumped, as shown it Fig. 2 of the drawings, with its rear end resting upon the wheels of the toothed roller. The fertilizer may then be distributed as desired, according to the adjustment of the supporting-arms. When not to be used for fertilizing purposes the roller may be removed without impairing the usefulness of the cart in any manner whatever.

Having thus described my invention, what I claim as new, and desire to secure by Letters Patent, is—

1. In a fertilizer - distributer, the distributing-roller C, provided with teeth extending its entire length, and an axle with bearings *b b* and wheels E E, in combination with adjustable brackets or supporting-arms D D, to be secured to a cart, substantially as specified.

2. In a fertilizer-distributer, substantially as described, the adjustable and removable brackets or arms D D, adapted to receive and support a distributing-roller, substantially as specified.

3. The fertilizer-distributer herein described, consisting of the cart A, having its side boards near their rear ends provided each with a plurality of perforations, the perforated removable brackets D D, provided with journal-bearings near their outer ends, the roller C, provided with teeth, axle $a$, and wheels E E, all combined and adapted to operate substantially as and for the purpose specified.

In testimony whereof I affix my signature in presence of two witnesses.

JAMES S. PEIRONNET.

Witnesses:
W. L. GARY,
W. F. PEIRONNET.